(12) United States Patent
Kuo et al.

(10) Patent No.: US 6,859,624 B1
(45) Date of Patent: Feb. 22, 2005

(54) LASER DIODE OPTICAL TRANSMITTER FOR TDMA SYSTEM WITH FAST ENABLE AND DISABLE TIMES

(75) Inventors: Jerchen Kuo, Davis, CA (US); Michael Anthony O'Brien, Berkeley, CA (US)

(73) Assignee: Alloptic, Inc., Livermore, CA (US)

( * ) Notice: Subject to any disclaimer, the term of this patent is extended or adjusted under 35 U.S.C. 154(b) by 721 days.

(21) Appl. No.: 09/715,276

(22) Filed: Nov. 17, 2000

(51) Int. Cl.$^7$ .......................... H04B 10/00; H04B 10/04
(52) U.S. Cl. ...................... 398/182; 398/164; 398/197
(58) Field of Search .............................. 398/164, 182, 398/183, 184, 185, 186, 187, 195, 196, 197, 201; 372/29.01, 29.013, 29.015, 29.021

(56) References Cited

U.S. PATENT DOCUMENTS

| | | | |
|---|---|---|---|
| 4,723,312 A | * | 2/1988 | Yamashita et al. .......... 398/182 |
| 4,818,896 A | * | 4/1989 | Cavanna ...................... 326/90 |
| 5,140,175 A | | 8/1992 | Yagi et al. |
| 5,481,273 A | * | 1/1996 | Shigeta et al. ................. 345/94 |
| 5,812,572 A | | 9/1998 | King et al. |
| 6,018,538 A | | 1/2000 | Ota |
| 6,055,252 A | | 4/2000 | Zhang |
| 6,108,114 A | * | 8/2000 | Gilliland et al. ............ 398/195 |

* cited by examiner

*Primary Examiner*—Jason Chan
*Assistant Examiner*—Dzung Tran
(74) *Attorney, Agent, or Firm*—Hankin Patent Law; Marc E. Hankin

(57) ABSTRACT

A laser diode optical transmitter and a method of operating the optical transmitter utilize a transistor to quickly enable and disable a laser diode by selectively shorting the laser diode. In an embodiment, the transistor is separated from the laser diode by an inductor. The inductor provides a high impedance between the transistor and the laser diode to at least reduce the effect of a parasitic capacitance associated with the transistor when the laser diode is driven to generate optical signals of different power levels. The use of the transistor and the inductor (i) reduces the amount of leakage light generated by the laser diode when in a disabled state, (ii) shortens the enable and disable times of the optical transmitter, and (iii) allows the laser diode to be modulated at a high rate of speed.

20 Claims, 5 Drawing Sheets

LASER DIODE OPTICAL TRANSMITTER FOR TDMA SYSTEM WITH FAST ENABLE AND DISABLE TIMES

FIELD OF THE INVENTION

The invention relates generally to optical transmitters, and more particularly to an optical transmitter for a time division multiplex access (TDMA) system.

BACKGROUND OF THE INVENTION

The explosion of the Internet and the desire to provide multiple communications and entertainment services to end users have created a need for a broadband network architecture that improves access to end users. One broadband network architecture that improves access to end users is a point-to-multipoint passive optical network (PON). A point-to-multipoint PON is an optical access network architecture that facilitates broadband communications between an optical line terminal (OLT) and multiple remote optical network units (ONUs) over a purely passive optical distribution network. A point-to-multipoint PON utilizes passive fiber optic splitters and couplers to passively distribute optical signals between the OLT and the remote ONUs.

FIGS. 1A and 1B illustrate the management of network traffic in a point-to-multipoint PON. As an example, the PON is shown to include an OLT 102 and three ONUs 104, 106 and 108, although the PON may include additional ONUs. Referring to FIG. 1A, the OLT includes an optical transmitter 110 that sends downstream traffic containing ONU-specific information blocks 1, 2 and 3 to the ONUs. The downstream traffic is optically broadcasted by a passive optical splitter 112 into three separate signals that each carries all of the ONU-specific information blocks. The ONUs 104, 106 and 108 include optical receivers 114, 116 and 118, respectively, that receive all the information blocks transmitted by the OLT. Each ONU then processes the information blocks that are intended for that ONU and discards the information blocks that are intended for the other ONUs. For example, ONU-1 receives information blocks 1, 2, and 3. However, ONU-1 only delivers information block 1 to end user 1. Likewise, ONU-2 only delivers information block 2 to end user 2 and ONU-3 only delivers information block 3 to end user 3.

Referring to FIG. 1B, the ONUs 104, 106 and 108 also include optical transmitters 120, 122 and 124, respectively, to transmit upstream traffic to OLT 102. The upstream traffic is managed utilizing time division multiplexing, in which specific transmission time slots are dedicated to individual ONUs. The ONU-specific time slots are synchronized so that upstream information blocks from the ONUs do not interfere with each other once the information blocks are combined onto the common fiber. For example, ONU-1 transmits information block 1 in a first ONU-specific time slot, ONU-2 transmits information block 2 in a second ONU-specific time slot, and ONU-3 transmits information block 3 in a third ONU-specific time slot. The time division multiplexed upstream traffic is then received by an optical receiver 126 of the OLT.

There are a number of factors that contribute to the efficiency of a point-to-multipoint PON. One such factor is the length of guard bands between combined information blocks of the upstream traffic. These guard bands, or dark spaces, provide safety zones between information blocks to prevent collision of adjacent information blocks when they are combined onto the common fiber. However, the guard bands can occupy a significant amount of bandwidth and consequently, reduce the overall bandwidth of the PON for data transmission. Thus, minimizing the length of the guard bands will increase the bandwidth of the PON. However, in order to reduce the length of the guard bands, the optical transmitters of the ONUs must be able to more quickly start and stop sending optical signals, i.e., faster enable and disable times, to ensure that combined upstream information blocks are properly separated by the guard bands.

Another factor that contributes to the efficiency of the PON is the speed with which the optical transmitters of the ONUs can emit binary optical signals. That is, the speed with which the optical transmitters can modulate between "1" signals and "0" signals. Using optical transmitters with increased modulation speed, the PON can increase the rate with which data is transmitted between the OLT and the ONUs.

Still another factor that contributes to the efficiency of the PON is the amount of light leakage from disabled optical transmitters of the ONUs. Any leakage of light from a single disabled optical transmitter may increase the background noise. This is critical in a point-to-multipoint PON where light leakage from one disabled ONU will combine with light leakage from other disabled ONUs of the PON. The overall effect is that significant background noise may be created by the combined light leakage, which may affect the OLT from differentiating legitimate data from the background noise. This effect is amplified as the number of ONUs supported by the PON is increased.

In view of these factors, there is a need for an optical transmitter with fast enable and disable times, increased modulation speed, and reduced light leakage.

SUMMARY OF THE INVENTION

A laser diode optical transmitter and a method of operating the optical transmitter utilize a transistor to quickly enable and disable a laser diode by selectively shorting the laser diode. In an embodiment, the transistor is separated from the laser diode by an inductor. The inductor provides a high impedance between the transistor and the laser diode to at least reduce the effect of a parasitic capacitance associated with the transistor when the laser diode is driven to generate optical signals of different power levels. The use of the transistor and the inductor (i) reduces the amount of leakage light generated by the laser diode when in a disabled state, (ii) shortens the enable and disable times of the optical transmitter, and (iii) allows the laser diode to be modulated at a high rate of speed.

In an exemplary embodiment, the optical transmitter includes a light emitting device, a switching device, a modulation circuit and an inductive element. The light emitting device may be a laser diode that can generate light of different optical power levels. The switching device may be a transistor that is connected in parallel to the light emitting device to selectively short the light emitting device to disable the optical transmitter. In an embodiment, the transistor is a PNP bipolar transistor. The modulation circuit is configured to drive the light emitting device to generate light of different optical power levels. In an embodiment, the modulation circuit include a pair of differential transistors that are connected to the light emitting device and a modulation current source. The inductive element of the optical transmitter may be an inductor that provides an impedance between the light emitting device and the switching device. The impedance provided by the inductive element to at least reduce the effect of parasitic capacitance associated with the switching element when the light emitting device is driven by the modulation circuit.

In an embodiment, the optical transmitter further includes a controller that is connected to the switching device. The controller is configured to control the conductive state of the switching device. In one embodiment, the controller includes an input that receives a patterned signal. The controller is configured to activate the switching device to a conducting state when the patterned signal is not received by the controller.

In an exemplary embodiment, the method of operating an optical transmitter includes a step of driving a light emitting device to generate optical signals of different power levels and a step of providing an inductive impedance between the light emitting device and at least a switching device that can electrically short the light emitting diode. The inductive impedance reduces at least the effect of parasitic capacitance associated with the switching device when the light emitting device is driven to generate the optical signals. In an embodiment, the method also includes a step of receiving an indicator that is associated with a predefined condition to disable the optical transmitter and a step disabling the optical transmitter by activating the switching device to short the light emitting device in response to the indicator. In one embodiment, the step of receiving the indicator includes not receiving a patterned signal from an external source.

Other aspects and advantages of the present invention will become apparent from the following detailed description, taken in conjunction with the accompanying drawings, illustrated by way of example of the principles of the invention.

DETAILED DESCRIPTION OF THE INVENTION

Figure 1A:
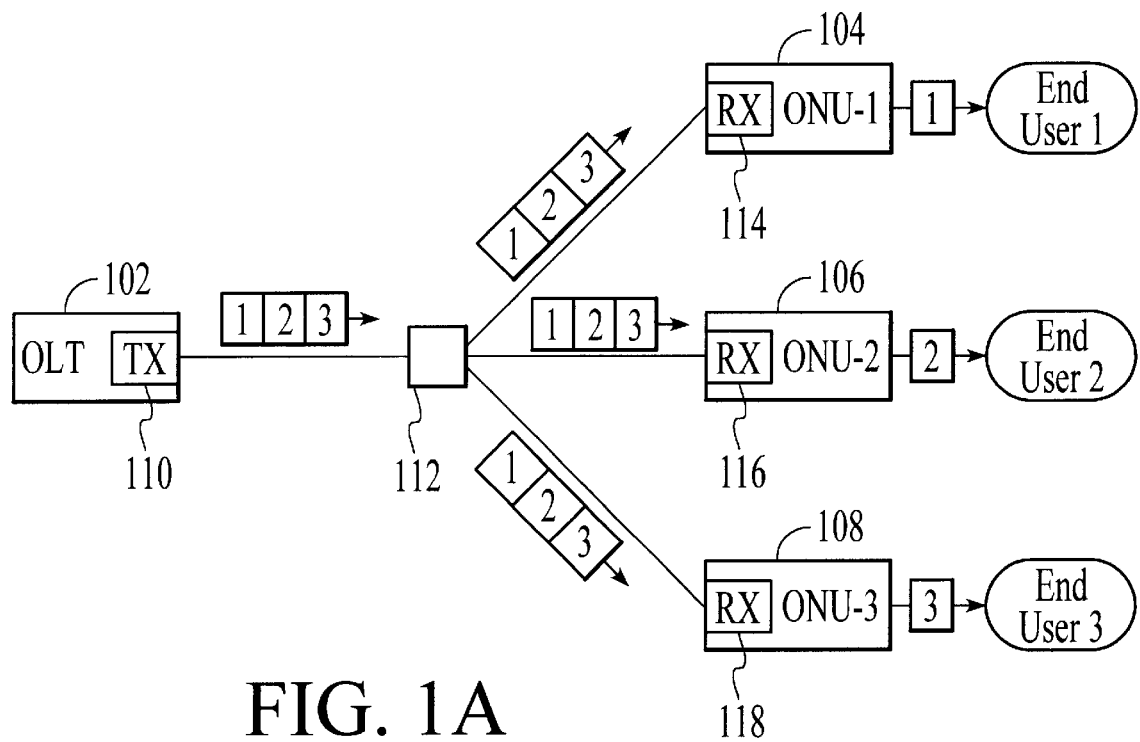
FIG. 1A illustrates the downstream flow of traffic from an OLT to multiple ONUs in a point-to-multipoint PON.
Figure 1B:
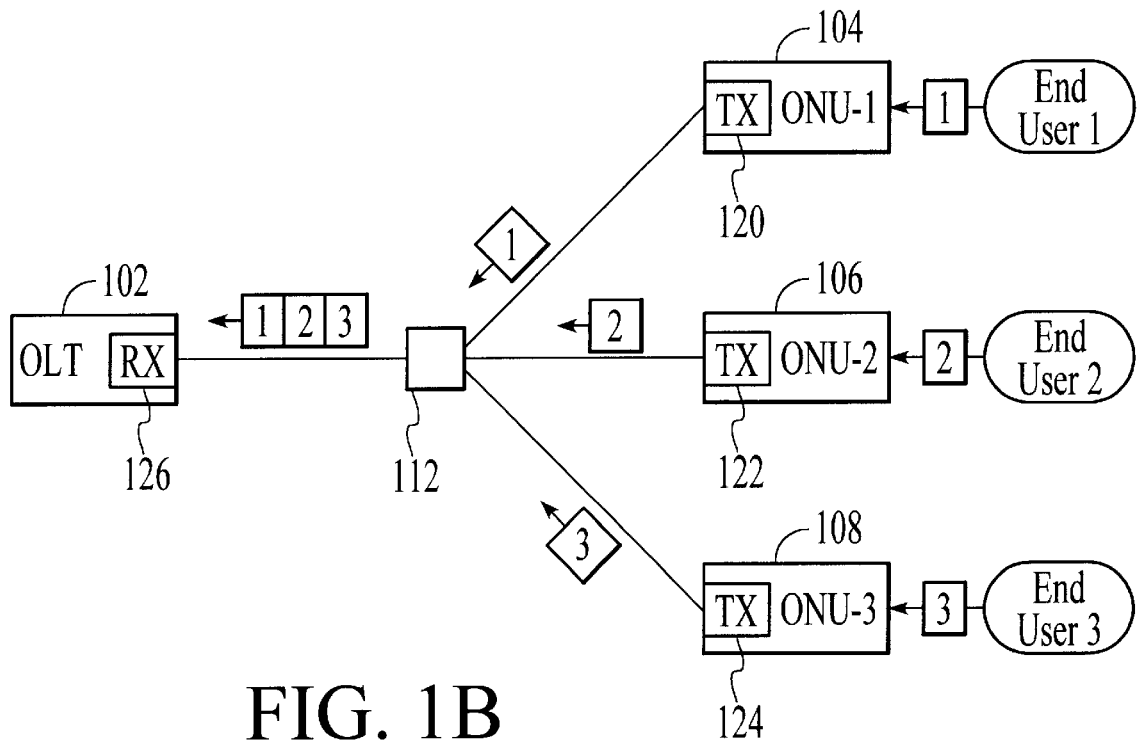
FIG. 1B illustrates the upstream flow of traffic from the ONUs to the OLT in the point-to-multipoint PON.
Figure 2:
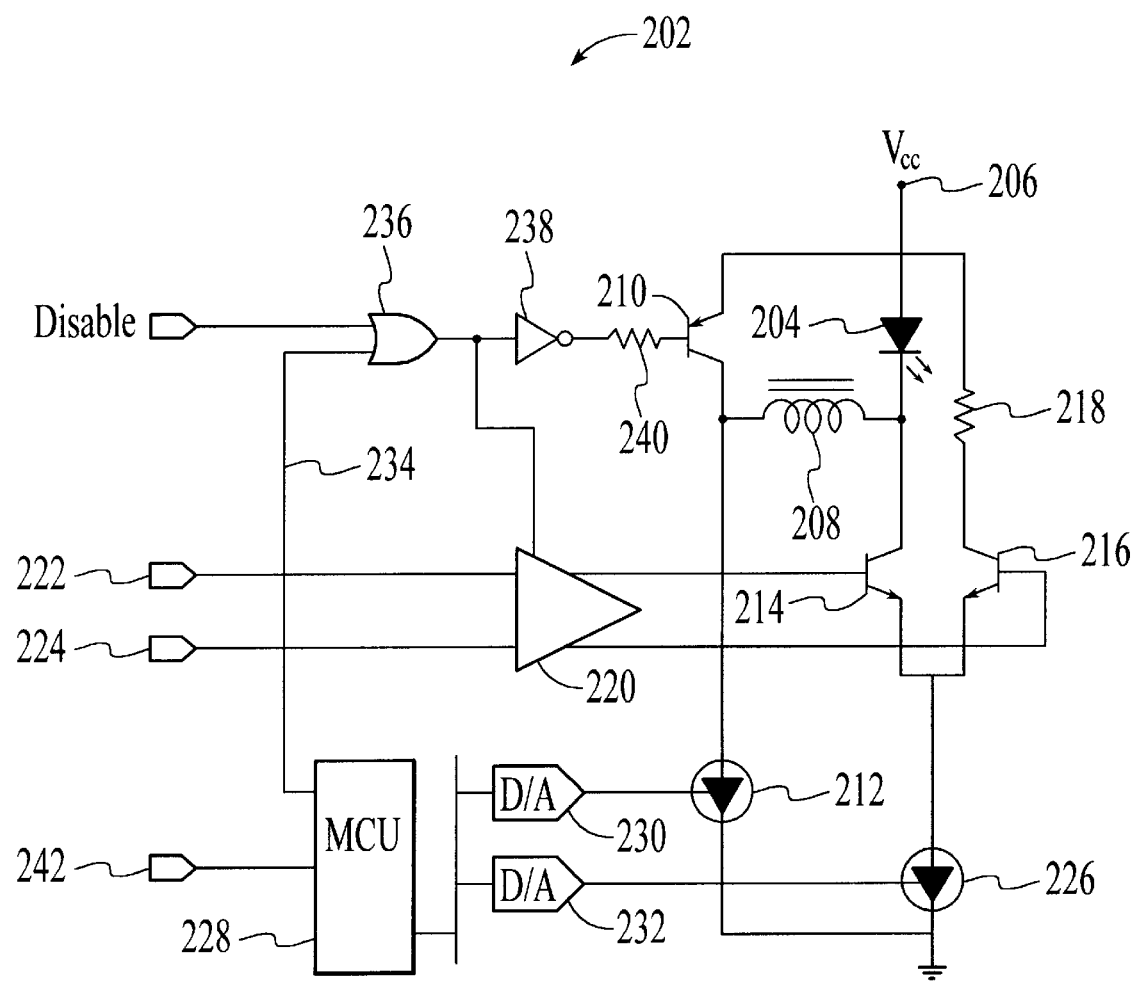
FIG. 2 is a schematic diagram of a laser diode optical transmitter that can be used in a point-to-multipoint PON in accordance with the present invention.

With reference to FIG. 2, a laser diode optical transmitter 202 for use in a passive optical network (PON) system that utilizes time division multiplex access (TDMA) is shown. The optical transmitter is characterized by fast enable and disable times so that the length of the guard bands used by the system can be minimized. In addition, the optical transmitter is designed to prevent, or significantly reduce, light leakage when disabled. Furthermore, the optical transmitter is designed to modulate output optical signals with sufficient speed for data transmission in the Gigabit per second range.

Figure 3:
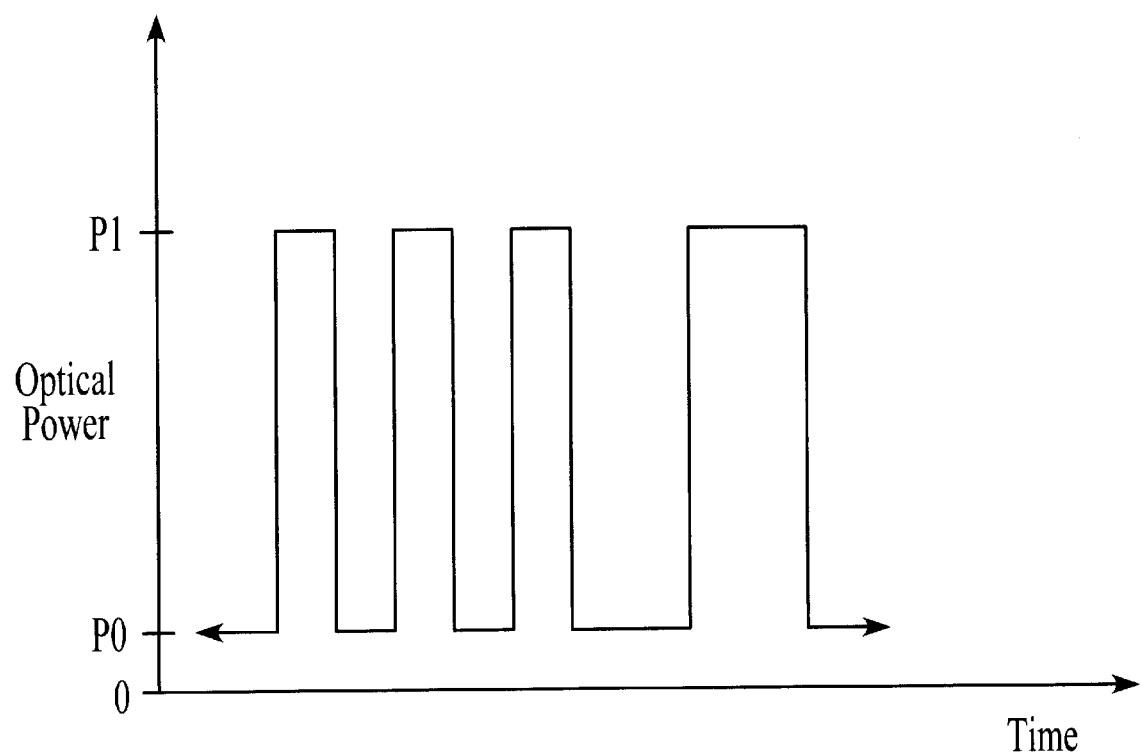
FIG. 3 illustrates the power levels of optical signals generated by the optical transmitter of FIG. 2.

The optical transmitter 202 includes a laser diode 204 that is driven to emit binary optical signals. As illustrated in FIG. 3, the laser diode can be driven to generate light signals having an optical power level of P1, which are optical representations of "1" signals. Alternatively, the laser diode can be driven to generate light signals having an optical power level of P0, which are optical representations of "1" signals.

As shown in FIG. 2, the anode of the laser diode 204 is coupled to a supply voltage terminal 206, while the cathode of the laser diode is coupled to an inductor 208. In parallel to the laser diode, a PNP bipolar transistor 210 is connected between the supply voltage terminal and the inductor. The emitter of the PNP transistor is coupled to the supply voltage terminal, while the collector of the PNP transistor is coupled to the inductor and a bias current source 212, which is connected to electrical ground. The bias current source conducts bias current through the laser diode when the PNP transistor is in a non-conducting state. However, when the PNP transistor is in a conducting state, the laser diode is shorted by the transistor and is disabled.

The laser diode 204 of the optical transmitter 202 is also coupled to the collector of an NPN bipolar transistor 214. The transistor 214 is part of a differential pair of NPN bipolar transistors 214 and 216. The collector of the transistor 216 is coupled to a resistor 218, which is connected to the supply voltage terminal 206. The bases of these transistors 214 and 216 are connected to a differential amplifier 220 having inputs 222 and 224. Signals applied to the inputs of the differential amplifier control the conducting state of the transistors 214 and 216. The emitters of the transistors 214 and 216 are connected to a modulation current source 226, which is connected to ground. The modulation current source conducts modulation current that flows through the laser diode then the transistor 214 is switched to a conducting state.

The optical transmitter 202 further includes a micro-controller unit 228 that controls various components of the transmitter. The micro-controller unit utilizes a digital-to-analog converter 230 to control the bias current source 212. Similarly, the micro-controller unit utilizes a second digital-to-analog converter 232 to control the modulation current source 226. The micro-controller unit can also control the PNP transistor by sending a disable signal through path 234 to an OR gate 236. The OR gate can also receive a disable signal from an external source. The OR gate is connected to an inverter 238 that outputs a signal to the base of the PNP transistor 210 via a resistor 240. Thus, a single disable signal to the OR gate will turn "on" the PNP transistor to disable the optical transmitter. The output of the OR gate is also connected to the differential amplifier 220 to disable and enable the differential amplifier.

The micro-controller unit 228 includes a security input 242, which is used to disable the optical transmitter 202 under certain conditions. These conditions may include the initialization period of an ONU embodying the optical transmitter 202, a failure of critical ONU components, and other conditions when the optical transmitter should not output any light. Under normal operation, a special pattern is received by the micro-controller unit through the security input. However, when the special pattern is lost due to a specified condition, the micro-controller unit sends a disable signal to the OR gate 236, disabling the optical transmitter to ensure that light is not emitted by the laser diode 204. Thus, under these conditions, the optical transmitter will not erroneously transmit light, which may interfere with the operation of a PON system that embodies the optical transmitter.

In operation, the micro-controller unit 228 provides a bias control signal to the bias current source 212, so that a predefined amount of current is flowing through the bias current source. Similarly, the micro-controller unit provides a modulation control signal to the modulation current source 226, so that a predefined modulation current is flowing through the modulation current source. In a disabled state, the PNP transistor 210 is activated to a conducting state by a disable signal to the OR gate 236, which may be from an external source or the micro-controller unit. The output signal from the OR gate is inverted by the inverter 238 and then applied to the base of the PNP transistor, turning "on" the PNP transistor. The output signal from the OR gate also disables the differential amplifier 220. When activated, the PNP transistor provides a current path that diverts current away from the laser diode 204, i.e. electrically shorts the laser diode.

The optical transmitter 202 is switched to an enabled state by removing the disable signal to the OR gate 236, which turns "off" the PNP transistor 210 and enables the differential amplifier 220. Consequently, the bias current is routed though the laser diode 204, which then generates light having an output power level of P0, as illustrated in FIG. 3. The light output of the laser diode is modulated between the power levels P0 and P1 by the signals on the inputs 222 and 224 of the differential amplifier 220. When a "high" signal is applied to the input 222 and a "low" signal is applied the input 224, the transistor 214 is turned "on" and the transistor 216 is turned "off". The activation of the transistor 214 increases the amount of current through the laser diode 204 by allowing the modulation current to flow through the laser diode. The increased current drives the laser diode to increase the output power level to P1, as illustrated in FIG. 3. However, when the signals to the inputs of the differential amplifier are reversed, the transistor 214 is turned "off" and the transistor 216 is turned "on". In this situation, the modulation current is not conducted through the laser diode. Thus, only the bias current is conducted through the laser diode. Hence, the light output of the laser diode falls back to the power level P0.

Figure 4:
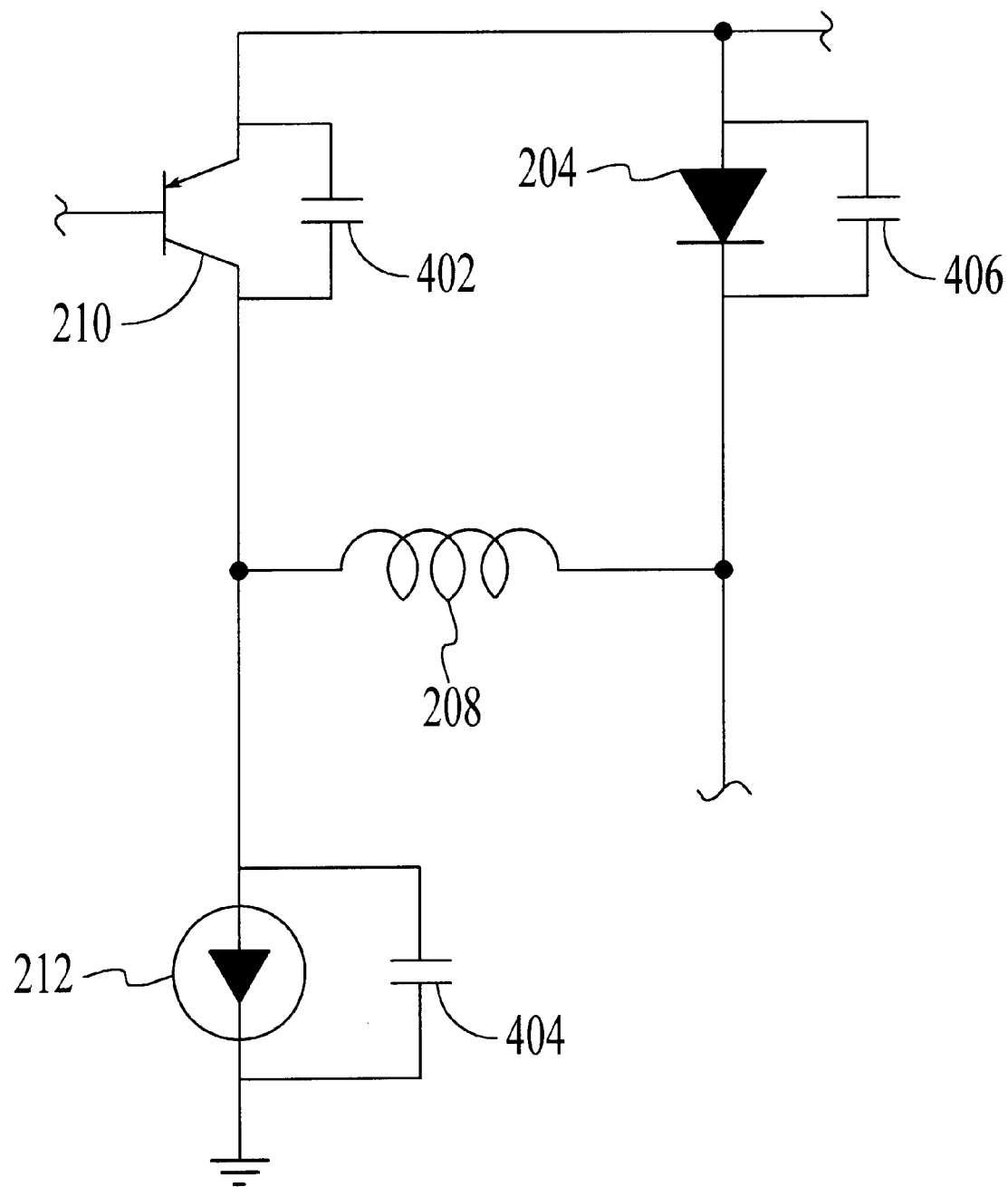
FIG. 4 illustrates the parasitic capacitors associated with some of the electrical components of the optical transmitter of FIG. 2.

The speed in which the laser diode 204 can be modulated to output light between the levels P0 and P1 is affected by the parasitic capacitance of the PNP transistor 210 and the bias current source 212. As illustrated in FIG. 4, the PNP transistor has an associated parasitic capacitor 402 and the bias current source has an associated parasitic capacitor 404. The laser diode also has an associated parasitic capacitor 406. These parasitic capacitors impact the rise and fall times of the laser diode to emit optical signals of power levels P0 and P1. The inductor 208 of the optical transmitter 202 operates to reduce the effects of the parasitic capacitors 402 and 404 so that the laser diode can be driven to modulate the optical signals between the output power levels P0 and P1 at a high rate of speed.

An impedance of an inductor is defined by the following equation.

$$I=2\pi fL,$$

where f is the frequency of the current through the inductor and L is the inductance of the inductor. Thus, as the frequency increases, the impedance of an inductor becomes greater. The optical transmitter 202 utilizes this fact to provide a high impedance between the laser diode 204 and both the PNP transistor 210 and the bias current source 212 at times when it is needed the most. That is, when the laser diode is modulated at a high rate of speed, the inductor 208 provides a high impedance due to the high frequency of the current through the inductor. Therefore, the effects of the parasitic capacitors 402 and 404 associated with the PNP transistor and the bias current source are significantly reduced. Consequently, the laser diode can be modulated at a higher rate of speed.

Figure 5:
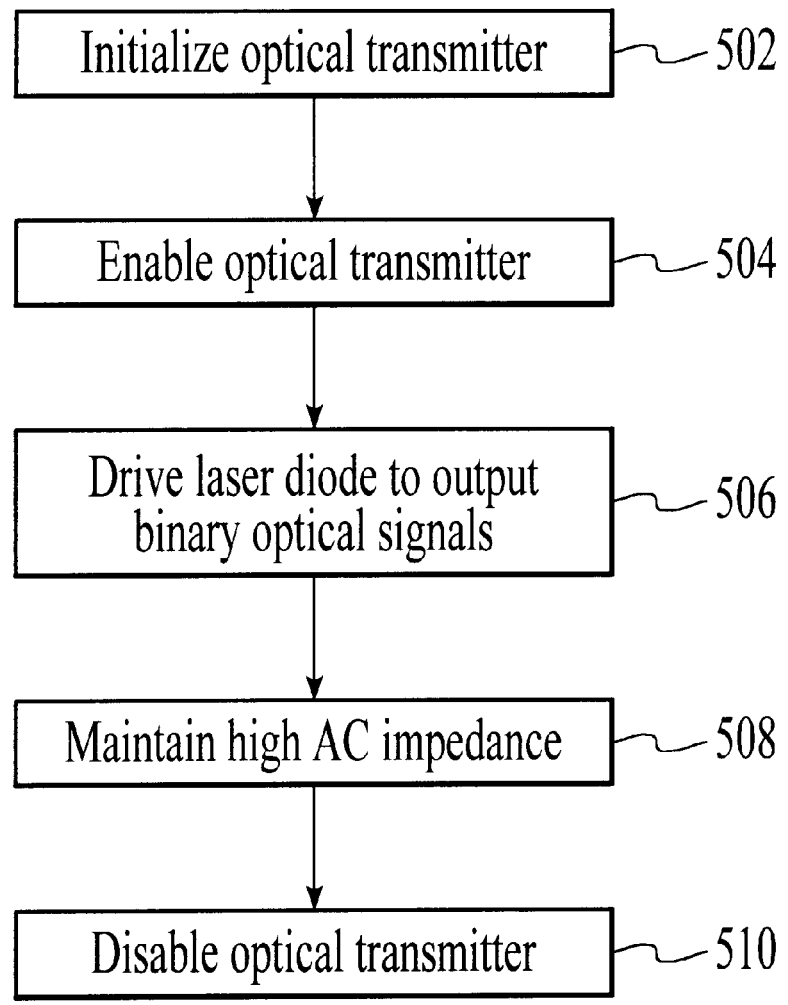
FIG. 5 is process flow diagram of a method of operating the optical transmitter of FIG. 2 in accordance with the present invention.

A method of operating the laser diode optical transmitter 202 in accordance with the present invention is described with reference to FIGS. 2 and 5. At step 502, the optical transmitter is initialized. During this step, control signals are transmitted from the micro-controller unit 228 to the bias current source 212 and the modulation current source 226 such that bias current is flowing through the bias current source and modulation current is flowing through the modulation current source. In addition, a disable signal is transmitted to the OR gate 236, turning "on" the PNP transistor 210 to ensure that the optical transmitter is in a disabled state, i.e., the laser diode 204 is not emitting any light. The disable signal also deactivates the differential amplifier 220. At step 504, the optical transmitter is enabled by removing the disable signal from the OR gate 236, which turns "off" the PNP transistor to allow the bias current to flow through the laser diode. The removal of the disable signal also activates the differential amplifier.

Next, at step 506, the laser diode 204 is driven to generate binary optical signals of power levels P0 and P1 by applying appropriate signals to the inputs 222 and 224 of the differential amplifier 220. At step 508, a high AC impedance is maintained between the laser diode 204 and both the PNP transistor 210 and the bias current source 212 by the inductor 208. As stated above, the impedance of the inductor reduces the effect of parasitic capacitance associated with the PNP transistor and the bias current source so that the optical signals generated by the laser diode can be switched between the power levels P0 and P1 at a high rate of speed. At step 510, the optical transmitter is disabled by applying a disable signal to the OR gate 236, which turns "on" the PNP transistor. The disable signal also deactivates the differential transmitter 220. The disable signal may be from an external source. Alternatively, the disable signal may be from the micro-controller unit 228 in response to loss of a special pattern at the security input 242 of the micro-controller unit due to a specified condition.

What is claimed is:

1. An optical transmitter comprising:
   means for generating light energy;
   means for selectively shorting said generating means such that said generating means is disabled to generate said light energy when shorted;
   means for driving said generating means such that power of said light energy is modulated; and
   means for providing an impedance between said generating means and said selectively shorting means such that an effect of parasitic capacitance associated with said selectively shorting means on said generating means is reduced when said generating means is driven by said driving means.

2. The optical transmitter of claim 1 wherein said means for providing said impedance between said generating means and said selectively shorting means includes an inductor.

3. The optical transmitter of claim 2 further comprising a bias current source that is connected in series with said generating means and said inductor.

4. The optical transmitter of claim 1 wherein said means for selectively shorting said generating means includes a PNP transistor.

5. The optical transmitter of claim 1 further comprising a controller coupled to said selectively shorting means, said controller being configured to control said selectively shorting means.

6. The optical transmitter of claim 5 wherein said controller includes an input to receive an indicator, said controller being configured to control said selectively shorting means in response to said indicator.

7. The optical transmitter of claim 6 wherein said controller is configured to activate said selectively shorting means when a patterned signal is not received by said controller.

8. The optical transmitter of claim 1 wherein said driving means includes differential transistors that are coupled to a modulation current source and said generating means.

9. A method of operating an optical transmitter comprising:

driving a light emitting device to generate optical signals of different power levels; and providing an inductive impedance between said light emitting device and at least a switching device that can electrically short said light emitting diode, said inductive impedance reducing the effect of parasitic capacitance associated with said switching device when said light emitting device is driven to generate said optical signals.

10. The method of claim 9 further comprising:

receiving an indicator to disable said optical transmitter, said indicator being associated with a predefined condition; and disabling said optical transmitter by activating said switching device to deactivate said light emitting device in response to said indicator.

11. The method of claim 10 wherein said step of receiving said indicator include not receiving a patterned signal from an external source.

12. The method of claim 9 further comprising a step of enabling said optical transmitter by deactivating said switching device to a non-conducting state, said deactivation of said switching device allowing current to flow through said light emitting device.

13. The method of claim 9 wherein said switching device includes a PNP transistor connected in parallel to said light emitting device.

14. An optical transmitter comprising:

a light emitting device that generates light energy;

a switching device coupled in parallel to said light emitting device, said switching device being configured to selectively disable said light emitting device from generating said light energy by shorting said light emitting device when said switching device is electrically closed;

a modulation circuit coupled to said light emitting device, said modulation circuit being configured to regulate current through said light emitting device to modulate the optical power of said light energy; and an inductive element coupled to said light emitting device and said switching device such that said inductive element is located between said switching device and said modulation circuit, said inductive element providing an impedance between said light emitting device and said switching device such that an effect of parasitic capacitance associated with said switching device on said light emitting device is reduced when said light emitting device is driven by said modulation circuit.

15. The optical transmitter of claim 14 further comprising a bias current source that is connected in series with said light emitting device and said inductive element such that said inductive element is disposed between said light emitting device and said bias current source.

16. The optical transmitter of claim 15 further comprising a controller operatively coupled to said switching device, said controller being configured to control said switching device.

17. The optical transmitter of claim 16 wherein said controller includes an input to receive a patterned signal, said controller being configured to activate said switching device to a conducting state in response to an absence of said patterned signal.

18. The optical transmitter of claim 14 wherein said switching device includes a PNP transistor.

19. The optical transmitter of claim 14 wherein said light emitting device includes a laser diode.

20. The optical transmitter of claim 14 wherein said modulation circuit includes differential transistors that are coupled to a modulation current source and said light emitting device.

* * * * *